US006653972B1

(12) United States Patent
Krikorian et al.

(10) Patent No.: US 6,653,972 B1
(45) Date of Patent: Nov. 25, 2003

(54) ALL WEATHER PRECISION GUIDANCE OF DISTRIBUTED PROJECTILES

(75) Inventors: Kapriel V. Krikorian, Oak Park, CA (US); Robert A. Rosen, Simi Valley, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/143,433

(22) Filed: May 9, 2002

(51) Int. Cl.$^7$ ................................................ G01S 13/72
(52) U.S. Cl. ........................ 342/62; 342/107; 342/147; 244/3.11; 244/3.13
(58) Field of Search ...................... 342/62, 107, 147; 244/3.11–3.15, 3.1, 3.19–3.29; 89/36.01, 41.22; 701/221

(56) References Cited

U.S. PATENT DOCUMENTS

| | | | | |
|---|---|---|---|---|
| 3,727,569 A | * | 4/1973 | Johnson et al. ............ | 114/20.1 |
| 4,215,630 A | * | 8/1980 | Hagelberg et al. .......... | 89/1.11 |
| 5,379,966 A | * | 1/1995 | Simeone et al. ............ | 244/3.11 |
| 5,451,014 A | * | 9/1995 | Dare et al. .................. | 244/3.15 |
| 5,660,355 A | * | 8/1997 | Waymeyer ................. | 244/3.15 |
| 5,857,644 A | * | 1/1999 | Kusters ..................... | 244/3.15 |
| 6,204,801 B1 | * | 3/2001 | Sharka et al. ................ | 342/62 |
| 6,222,479 B1 | * | 4/2001 | Honigsbaum ................ | 342/13 |
| 2003/0057320 A1 | * | 3/2003 | Schneider et al. ............ | 244/63 |

* cited by examiner

Primary Examiner—Thomas H. Tarcza
Assistant Examiner—Isam Alsomiri
(74) Attorney, Agent, or Firm—Leonard A. Alkov; Glenn H. Lenzen, Jr.

(57) ABSTRACT

A system and method (32) for measuring line-of-sight angular rates for all-weather precision guidance of distributed projectiles (16) and a guidance system (10) based thereon. In accordance with the novel method (32) for measuring line-of-sight angular rates, first the range rates of the target (14) relative to at least two projectiles (16) is determined, as well as the position and velocity of each projectile (16). Then, the line-of-sight angular rate of the target (14) relative to at least one projectile (16) is computed from the range rates, positions, and velocities. In the illustrative embodiment, the range rate of the target (14) relative to a projectile (16) is determined based on a monostatic target Doppler measurement, a monostatic projectile Doppler measurement, a bistatic Doppler measurement of the target (14) by the projectile (16), and the carrier frequency of a data link (26) between the projectile and the shipboard system. The guidance system (10) of the present invention includes a monostatic radar (18) illuminating the target (14), bistatic receivers (44) aboard at least two projectiles (16) fired at the target (14), and a system (32) for determining line-of-sight angular rates to the target based on the monostatic measurements and the bistatic measurements from at least two projectiles. The guidance system (10) further includes a system (34) for computing guidance command signals for at least one projectile based on the line-of-sight angular rates, and a projectile steering unit (52) aboard at least one projectile for steering the projectile based on the guidance command signals.

14 Claims, 2 Drawing Sheets

ALL WEATHER PRECISION GUIDANCE OF DISTRIBUTED PROJECTILES

BACKGROUND OF THE INVENTION

1. Field of the Invention

The present invention relates to radar guidance systems. More specifically, the present invention relates to systems and methods for measuring line-of-sight angular rates for guided projectiles.

2. Description of the Related Art

Navy ships are exposed to low flying, fast, and highly maneuverable missile threats. In order to provide the ships with an effective missile defense system, high accuracy measurements of incoming missile targets and precision guidance of anti-missile projectiles are required.

Many guidance systems have been developed for missiles and projectiles (i.e. —bullets). In a typical radar based guidance system, the projectile is guided to the target by guidance signals developed from tracking data obtained either by a shipboard radar system or by a radar system located totally, or partially, within the projectile. The former system is commonly referred to as a command guidance system and the latter as a homing guidance system.

In a command guidance system, a high-resolution shipboard radar system racks both the target and the projectile, calculates the proper guidance signals for the projectile based on the generated tracking data, and transmits the signals to the projectile to enable the projectile to intercept the target.

In a homing guidance system, the target tracking radar system is located totally or partially within the projectile. An active homing guidance system uses a monostatic radar system where both the radar transmitter and receiver are located in the projectile. A semi-active guidance system uses a bistatic radar system where a radar transmitter located remotely from the projectile (such as onboard the ship) illuminates the target and the reflected returns are received by a receiver located on the projectile. The tracking data from the radar measurements are then used to calculate the proper guidance signals to direct the projectile to the target.

Most of these systems are designed for use with missiles and larger caliber projectiles (greater than 3 inches in diameter), whereas the optimum caliber for high rate-of-fire guns is generally about 1 inch in diameter. Prior art guidance systems do not work well with smaller caliber projectiles. In particular, prior art approaches do not accurately measure the line-of-sight angular rate to the target with enough precision for the application. Command guidance systems with a high resolution monostatic shipboard radar are capable of measuring line-of-sight angular rate. However, these measurements are generally not as accurate as measurements made from the projectile, as with homing guidance systems. Homing systems, however, require a radar receiver onboard the projectile. The size of the smaller caliber projectiles places a constraint on the size of the radar receiver antenna on the projectile. With a small antenna, a relatively accurate range rate can be measured, but the angular rate will be imprecise.

The critical factor required for effective projectile guidance is an accurate measurement of the line-of-sight angular rate to the target relative to the projectile. Guidance algorithms depend on line-of-sight angular rate information to successfully direct a projectile to its target. Poor line-of-sight angular rate measurements may cause a projectile targeting error.

Hence, there is a need in the art for an improved method or system for accurately measuring line-of-sight angular rates for precision guidance of small caliber projectiles.

Furthermore, these guidance systems need to be effective under all weather conditions. Laser or ladar based guidance systems have been developed for small caliber projectiles. These systems offer very high angular resolution; however, they typically require favorable weather conditions to be effective. Adverse weather such as fog, rain, or clouds may block optical electromagnetic energy, causing a laser based guidance system to fail.

Hence, a need exists in the art for an improved method or system for accurately measuring line-of-sight angular rates for all-weather precision guidance of small caliber projectiles and a guidance system based thereon.

SUMMARY OF THE INVENTION

The need in the art is addressed by the system and method for measuring line-of-sight angular rates for all-weather precision guidance of projectiles and the guidance system based thereon of the present invention. This invention takes advantage of the fact that several projectiles are usually fired at the incoming target. While the LOS angular rate cannot be determined solely from the range rate measurements from a single projectile, it can be calculated if the range rate information from several projectiles is available.

In accordance with the novel method for measuring line-of-sight angular rates, first the range rates of the target relative to at least two projectiles is determined, as well as the position and velocity of each projectile. Then, the line-of-sight angular rate of the target relative to at least one projectile is computed from the range rates, positions, and velocities. In the illustrative embodiment, the range rate of the target relative to a projectile is determined based on a monostatic target Doppler measurement, a monostatic projectile Doppler measurement, a bistatic Doppler measurement of the target by the projectile, and the carrier frequency of a data link between the projectile and the shipboard system.

In an illustrative embodiment, the guidance system of the present invention includes a monostatic radar illuminating the target, bistatic receivers aboard at least two projectiles fired at the target, and a system for determining line-of-sight angular rates to the target based on the monostatic measurements and the bistatic measurements from at least two projectiles. The guidance system further includes a system for computing guidance command signals for at least one projectile based on the line-of-sight angular rates, and a projectile steering unit aboard at least one projectile for steering the projectile based on the guidance command signals.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
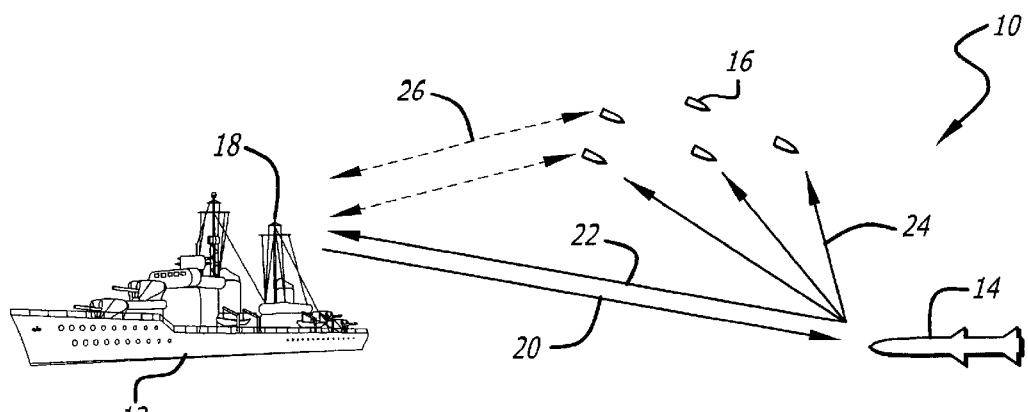
FIG. 1 is a diagram of an anti-ship missile defense system designed in accordance with the present teachings.

FIG. 1 is a diagram of an anti-ship missile defense system 10 designed in accordance with the present teachings showing a ship 12 and an incoming missile 14, also referred to as the target. The ship 12 fires several projectiles 16 to intercept the missile target 14. A shipboard radar 18 transmits a radar beam 20 towards the target 14. The monostatic reflected return 22 is received by the shipboard radar 18. In addition, bistatic illumination 24 reflected off the target 14 is received by each projectile 16. These bistatic measurements are transmitted to the shipboard radar 18 by a wireless data link 26. The monostatic and bistatic measurements are then used to calculate guidance signals to direct the projectiles 16 to the target 14. The guidance commands are transmitted to the projectiles 16 via the data link 26.

Figure 2:
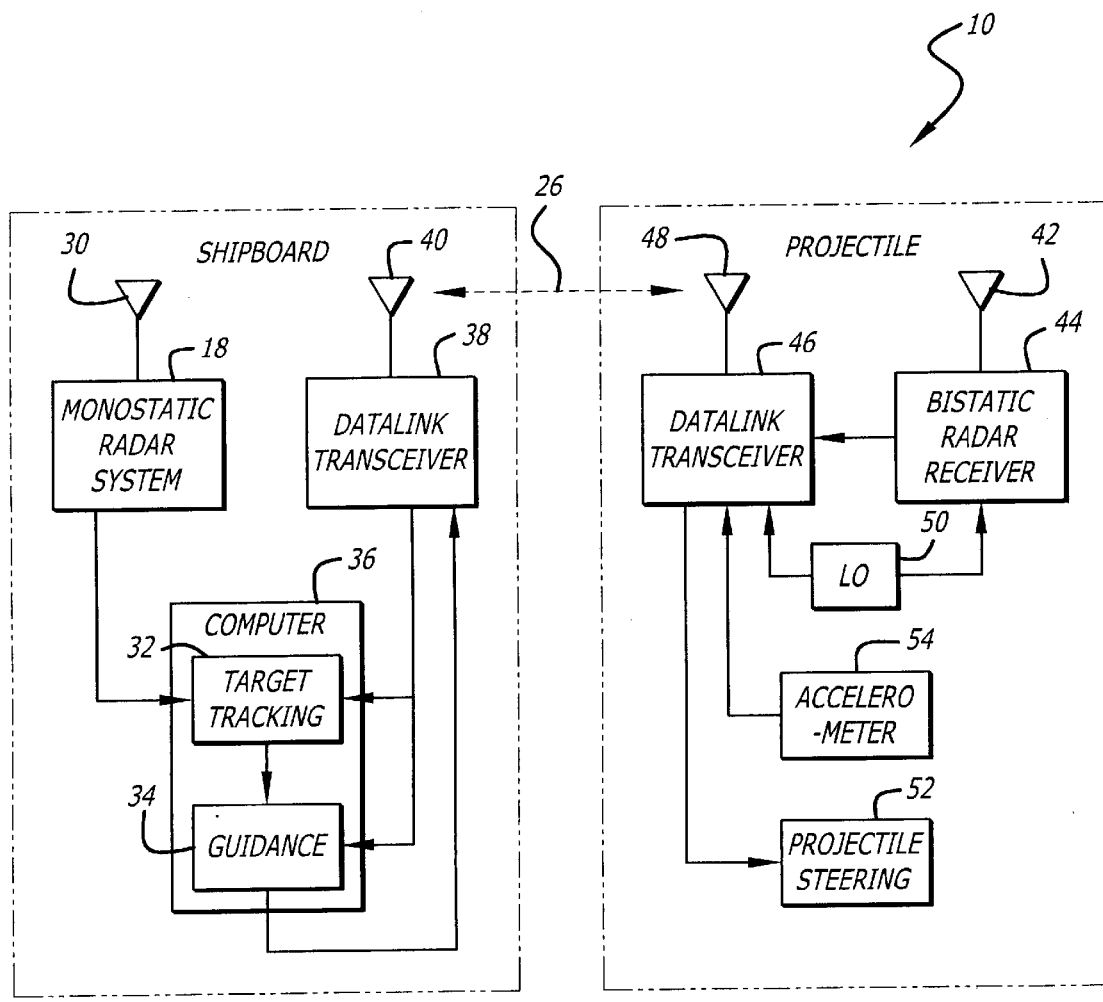
FIG. 2 is a block diagram showing the components of the projectile guidance system of the present invention in more detail.

FIG. 2 is a block diagram showing the components of the projectile guidance system 10 of the present invention in more detail. On the ship 12, a monostatic radar system 18 with a radar antenna 30 track the missile target 14 as well as the anti-missile projectiles 16. In the preferred embodiment, the radar system is using millimeter wave radar. A millimeter wave system is preferable because it provides very high angular resolution, while still providing weather penetration. The radar system 18 measures the position and monostatic Doppler of the target 14 and of each of the projectiles 16.

The radar measurements are used by a target tracking system 32 which calculates the range rates and line-of-sight angular rates needed by the guidance system 34 to compute guidance signals for the projectiles. In the illustrative embodiment, the tracking system 32 and guidance system 34 are implemented in software in a high-speed computer 36. A data link transceiver 38 with an antenna 40 is provided to communicate with the projectile. The data link transceiver 38 receives bistatic projectile measurements needed by the target tracking system 32 and roll angle measurements needed by the guidance system 34, and transmits guidance signals from the guidance system 34 to the projectiles.

On each projectile is a low cost bistatic radar receiver 44 and antenna 42. The projectile receiver measures the bistatic Doppler off the target and data links these measurements back to the shipboard radar by a data link transceiver 46 and antenna 48. The carrier frequency of the data link is synchronized to the receiver local oscillator (LO) 50. Thus the shipboard tracking system 32 can derive the local oscillator offset by comparing the data link carrier frequency with the Doppler of the skin return. The projectile data link transceiver 46 receives the guidance signals from the shipboard guidance system 34 and sends them to a projectile steering system 52. The projectile may also include an accelerometer 54 or other device for measuring properties of the projectile needed by the guidance system 34, such as the inertial roll angle. These measurements are transmitted to the shipboard system by the data link transceiver 46.

The present invention includes a novel method for determining the line-of-sight (LOS) angular rate to the target relative to each projectile by using the range rate information obtained from several projectiles. This invention takes advantage of the fact that several projectiles are usually fired at the incoming target. While the LOS angular rate cannot be determined solely from the range rate measurements from a single projectile, it can be calculated if the range rate information from several projectiles is available.

In accordance with the novel method, the range rate of the target relative to each projectile is determined based on the monostatic target Doppler, the monostatic projectile Doppler, the bistatic Doppler measurement of the target by the projectile, and the frequency of the data link carrier. The position and velocity of each projectile is also calculated based on the monostatic range, range rate, angle, and angle rate of the projectile measured by the shipboard radar system. Finally, the line-of-sight angular rates to the target from each projectile are computed, which are the key measurements in projectile guidance.

The relatively large separation between the projectiles (compared to their diameter) leads to highly accurate measurements of the line-of-sight angular rates. Note that unambiguous angular accuracy relative to the separations is not required, so the separations do not need to be measured to within a wavelength.

Figure 3:
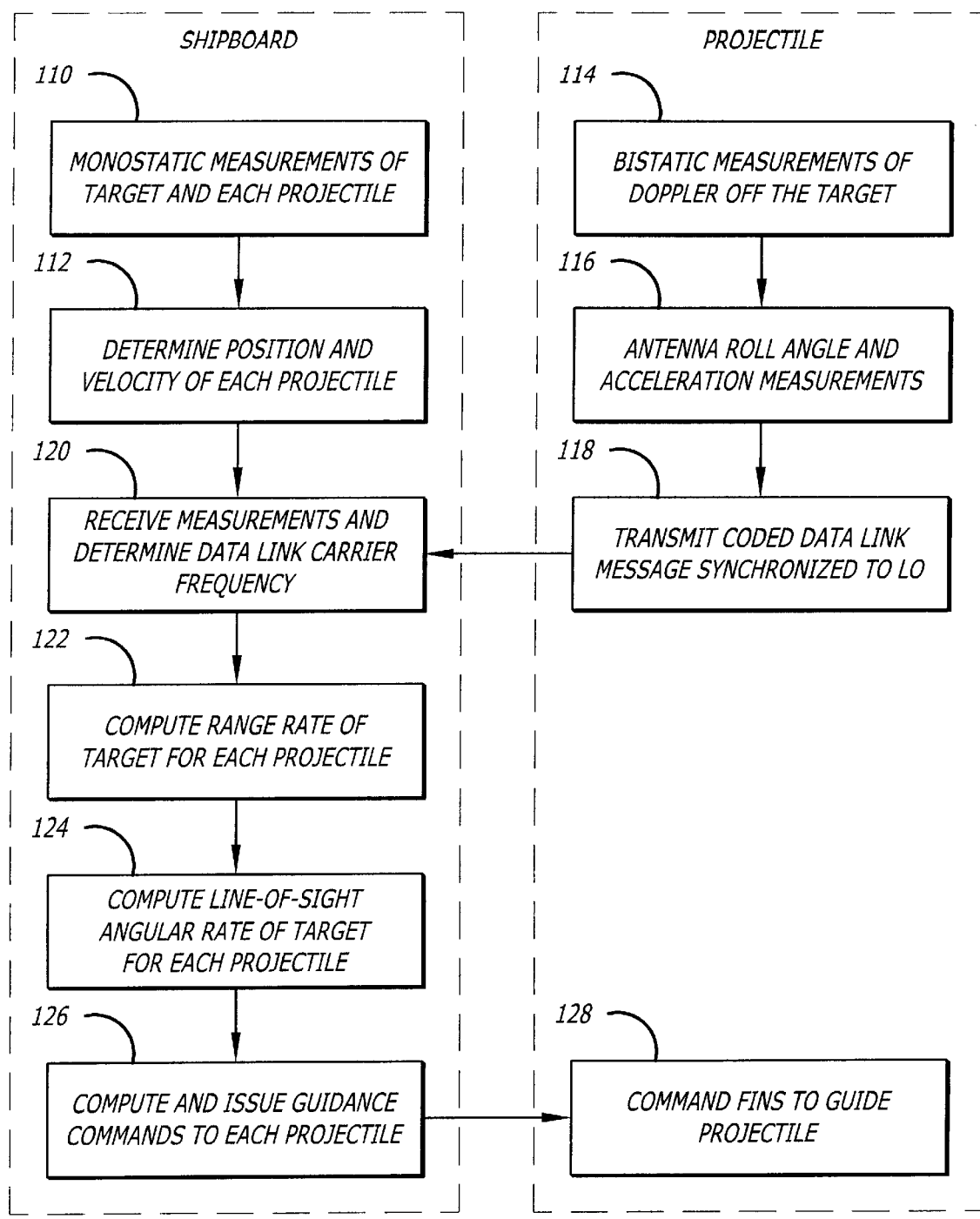
FIG. 3 is a flow chart that illustrates the operation of the guidance system of the present invention.

FIG. 3 is a flow chart that illustrates the operation of the guidance system of the present invention. First, at Step 110, the monostatic shipboard radar system measures the range, range rate, and angle of the target (relative to the shipboard radar), and the range, range rate, angle, and angle rate of the projectiles (relative to the shipboard radar) in accordance with conventional methods.

At Step 112, the position and velocity of each projectile is determined. In the illustrative example, the position and velocity of each projectile is calculated based on the monostatic radar measurements of the projectile. The skin return of the projectile can be enhanced by a rear corner reflector. Alternatively, the position of each projectile may be determined by a transponder return of the projectile. In the illustrative example, the location of each projectile $b_i$ is determined relative to the centroid of the ensemble of projectiles, and the relative velocity of each projectile $\Delta v_i$ is calculated relative to the mean velocity of all the projectiles.

Meanwhile, at Step 114, the receiver aboard each projectile measures the bistatic Doppler $f_{BD}$ off the target.

At Step 116, properties of the projectile needed by the guidance system such as the antenna roll angle and acceleration are measured in accordance with conventional methods. For example, the inertial roll angle of the projectile may be determined based on an accelerometer that is compensated for inertial acceleration based on the measured change of projectile velocity.

At Step 118, the bistatic Doppler measurements and antenna roll angle and acceleration measurements are transmitted to the shipboard system by a coded data link message. The carrier frequency of the data link is synchronized to the local oscillator of the projectile receiver.

At Step 120, the shipboard system receives the projectile measurements from the data link and measures the carrier frequency of the data link $f_{DLM}$ for each projectile.

At Step 122, the range rate of the target relative to the projectile $\dot{R}_i$ is calculated for each projectile. The range rate $\dot{R}_i$ is given by the following equation:

$$\dot{R}_i = \dot{R}_B - \dot{R}_M \quad [1]$$

where $\dot{R}_M$ is the range rate of the target relative to the monostatic radar and $\dot{R}_B$ is the bistatic range rate.

The bistatic range rate $\dot{R}_B$ is the rate of change of the sum of the distance from the monostatic radar transmitter to the target plus the distance from the target to the bistatic receiver, and is determined from the bistatic Doppler measured by the projectile. The bistatic range rate $\dot{R}_B$ is given by the following equation:

$$\dot{R}_B = \frac{cf_{BDT}}{f_R} \quad [2]$$

where c is the speed of light, $f_R$ is the frequency of the transmitted radar, and $f_{BDT}$ is the true bistatic Doppler frequency.

The true bistatic Doppler $f_{BDT}$ adjusts the Doppler frequency measured by the projectile receiver to accommodate any differences between the receiver local oscillator frequency and the monostatic local oscillator reference. The true bistatic Doppler frequency $f_{BDT}$ is calculated from the following equation:

$$f_{BDT} = f_{BD} - \epsilon f_R \quad [3]$$

where $f_{BD}$ is the bistatic Doppler frequency measured by the projectile and $\epsilon$ is the fractional frequency error of the projectile local oscillator relative to the monostatic local oscillator. The LO frequency error $\epsilon$ is given by:

$$\varepsilon = \frac{f_{DLM}}{f_{DL}} - 1 + \frac{\dot{R}_{SM}}{c} \quad [4]$$

where $f_{DL}$ is the nominal data link carrier frequency, $f_{DLM}$ is the data link carrier frequency measured by the shipboard receiver, and $\dot{R}_{SM}$ is the range rate of the projectile relative to the monostatic radar.

Thus, the range rate of the target relative to the projectile $\dot{R}_i$ is calculated from the range rate of the target relative to the monostatic radar $\dot{R}_M$, the range rate of the projectile relative to the monostatic radar $\dot{R}_{SM}$, the bistatic Doppler frequency measured by the projectile $f_{BD}$, and the data link carrier frequency measured by the shipboard receiver $f_{DLM}$. This range rate $\dot{R}_i$ is computed for each projectile.

At Step 124, the line-of-sight angular rate is computed for each projectile. First, the line-of-sight angular rate relative to the centroid of the ensemble of projectiles $\hat{\omega}$ is calculated by the following equation:

$$\hat{\omega} = s \times I^{-1} \sum_i b_i (\dot{R}_i + \Delta v_i^T s) \quad [5]$$

where s is the line-of-sight unit vector from the centroid towards the target, $b_i$ is the location vector of each projectile relative to the centroid projected onto the plane perpendicular to s, I is the second order moment matrix of the ensemble of projectiles $$\left(\text{given by } I = \sum_i b_i b_i^T\right),$$

$\dot{R}_i$ is the range rate to the target for each projectile as computed in Step 122 ($\dot{R}_i$ is negative for closing), and $\Delta v_i$ is the velocity vector of each projectile relative to the mean velocity.

After the line-of-sight angular rate relative to the centroid $\hat{\omega}$ is computed, the line-of-sight angular rates relative to each projectile $\hat{\omega}_i$ are computed using the following equation:

$$\hat{\omega}_i = \hat{\omega} - \left[\frac{s}{R} \times \left(\Delta v_i - \frac{b_i \dot{R}}{R}\right)\right] \quad [6]$$

where R is the mean range to the target and $\dot{R}$ is the mean range rate of the target relative to the projectiles (negative for closing).

At Step 126, the line-of-sight rates are used to compute guidance commands in accordance with conventional methods. The guidance commands are transmitted to each projectile via the data link.

Finally, at Step 128, the projectiles receive their guidance commands and, in accordance with conventional methods, adjust their navigational fins to guide the projectiles to the target.

Thus, accurate measurements of projectile velocities, especially in the forward direction, are essential. In the illustrative example, this accuracy is attained because of the enhanced projectile radar cross section, or by projectile transponders. The RMS accuracy $\sigma_w$ of the line-of-sight angular rate as calculated by this method is given approximately by:

$$\sigma_w = \sigma_{\dot{R}}/(\sqrt{N} \cdot D) \quad [7]$$

where $\sigma_{\dot{R}}$ is the bistatic Doppler accuracy of the projectile receiver, N is the number of projectiles, and D is the RMS distance between projectiles.

While the present invention is described herein with reference to illustrative embodiments for a particular application (an anti-ship missile defense system), it should be understood that the invention is not limited thereto. It may be applied to any precision targeting application.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for determining the line-of-sight angular rate to a target comprising:

first means for determining range rates $\dot{R}_i$ of the target relative to at least two projectiles, wherein said first means includes a monostatic millimeter wave radar which measures the range, range rate and angle of the target, and the range, range rate, angle, and angle rate of each projectile;

second means for determining the position and velocity of each projectile;

third means for calculating the line-of-sight angular rate of the target relative to at least one projectile $\hat{\omega}_i$ from said range rates, positions, and velocities; and fourth means for obtaining a bistatic range rate $\dot{R}_B$ from each of the projectiles, wherein said fourth means is included in said first means.

2. The invention of claim 1 wherein said fourth means includes a bistatic radar receiver aboard each projectile for measuring the Doppler frequency of the target from each of the projectiles.

3. The invention of claim 2 wherein said fourth means further includes fifth means for transmitting said Doppler measurements to said system.

4. The invention of claim 3 wherein said fifth means includes a data link having a carrier frequency synchronized to the local oscillator of the projectile radar receiver.

5. The invention of claim 4 wherein said first means further includes means for adjusting said Doppler measurements for differences between the projectile receiver local oscillator frequency and the monostatic radar local oscillator frequency.

6. The invention of claim 5 wherein said adjusted Doppler frequencies $f_{BDT}$ are obtained by taking the bistatic Doppler measurements $f_{BD}$ and subtracting the fractional local oscillator frequency error $\epsilon$ times the frequency of the monostatic radar $f_R$.

7. The invention of claim 6 wherein the fractional local oscillator frequency error is computed from $$\varepsilon = \frac{f_{DLM}}{f_{DL}} - 1 + \frac{\dot{R}_{SM}}{c},$$

where $f_{DL}$ is the nominal data link carrier frequency, $f_{DLM}$ is the measured data link carrier frequency, $\dot{R}_{SM}$ is the range rate of the projectile relative to the monostatic radar, and c is the speed of light.

8. The invention of claim 5 wherein said bistatic range rate $\dot{R}_B$ is calculated by taking the adjusted Doppler frequency $f_{BDT}$, multiplying by the speed of light c, and dividing by the frequency of the monostatic radar $f_R$.

9. The invention of claim 1 wherein the range rate of the target relative to a projectile $\dot{R}_i$ is determined by subtracting the range rate of the target relative to the monostatic radar $\dot{R}_M$ from the bistatic range rate $\dot{R}_B$.

10. The invention of claim 1 wherein the position and velocity of each projectile is calculated based on the monostatic radar measurements of the projectile.

11. The invention of claim 1 wherein said third means includes calculating the line-of-sight angular rate of the target relative to the centroid of the projectiles $\hat{\omega}_i$ using the following equation $$\hat{\omega} = s \times I^{-1} \sum_i b_i (R_i + \Delta v_i^T s),$$

where s is the line-of-sight unit vector from the centroid towards the target and I is the second order moment matrix of the ensemble of projectiles in the plane perpendicular to s.

12. The invention of claim 11 wherein the line-of-sight angular rate of the target relative to each projectile $\hat{\omega}_i$ is calculated by the following equation:

$$\hat{\omega}_i = \hat{\omega} - \left[ \frac{s}{R} \times \left( \Delta v_i - \frac{b_i \dot{R}}{R} \right) \right],$$

where R is the mean range to the target and $\dot{R}$ is the mean range rate of the target relative to the projectiles.

13. A system for guiding projectiles to a target comprising:

a monostatic radar system for illuminating the target and measuring monostatic returns from the target and from the projectiles;

a bistatic receiver aboard each projectile for measuring the bistatic Doppler off the target;

a target tracking system for determining the line-of-sight angular rates to the target based on said monostatic measurements and the bistatic measurements from at least two projectiles;

a guidance system for computing guidance command signals for each projectile based on said line-of-sight angular rates;

a projectile steering unit aboard each projectile for steering the projectile based on said guidance command signals;

a transceiver for receiving the bistatic measurements from the projectiles and sending the guidance command signals to the projectiles; and a transceiver aboard each projectile for sending the bistatic measurements to the target tracking system and receiving the guidance command signals.

14. A system for determining the line-of-sight angular rate to a target comprising:

first means for determining range rates $\dot{R}_i$ of the target relative to at least two projectiles, wherein said first means includes a monostaric shipboard radar which measures the range, range rate and angle of the target, and the range, range rate, angle, and angle rate of each projectile;

second means for determining the position and velocity of each projectile;

third means for calculating the line-of-sight angular rate of the target relative to at least one projectiles $\hat{\omega}_i$ from said range rates, positions, and velocities; and fourth means for obtaining a bistatic range rater $\dot{R}_B$ from each of the projectiles, wherein said fourth means is included in said first means.

* * * * *